United States Patent [19]
Helmetsie

[11] Patent Number: 5,701,991
[45] Date of Patent: Dec. 30, 1997

[54] CLAMPING MECHANISM

[75] Inventor: Eugene Helmetsie, Spencer, N.Y.

[73] Assignee: Hi-Speed Checkweigher Co., Inc., Ithaca, N.Y.

[21] Appl. No.: 597,642

[22] Filed: Feb. 6, 1996

[51] Int. Cl.[6] ................................................ B65G 21/20
[52] U.S. Cl. .................... 198/836.1; 198/836.3; 403/400; 403/DIG. 9; 248/228.4; 248/229.13; 248/229.23
[58] Field of Search ..................... 198/836.1, 836.3; 403/400, DIG. 9, 396, 385; 248/228.4, 229.13, 229.23

[56] References Cited

U.S. PATENT DOCUMENTS 1,074,272  9/1913  Kline ................................. 248/229.23
1,631,831  6/1927  Palmer-Jones .......................... 403/385
5,421,678  6/1995  Aidlin et al. ......................... 198/836.3

OTHER PUBLICATIONS

Nolu Plastics, Inc., Cross Block Sales Literature—Date of Prior Art Unknown.
Valu Guide, Cross Block Sales Literature—Apr. 1993.

Primary Examiner—Joseph E. Valenza
Attorney, Agent, or Firm—Bean, Kauffman & Snyder

[57] ABSTRACT

A clamp assembly for mounting an art device having a depending support bar on a rail extending horizontally lengthwise of a conveyor, which permits adjustment of the position of the clamp assembly lengthwise of the rail without effecting the vertical position of the art device and permits adjustment of the vertical position of the art device relative to the rail without affecting the adjusted position of the clamp assembly lengthwise relative to the rail.

21 Claims, 4 Drawing Sheets

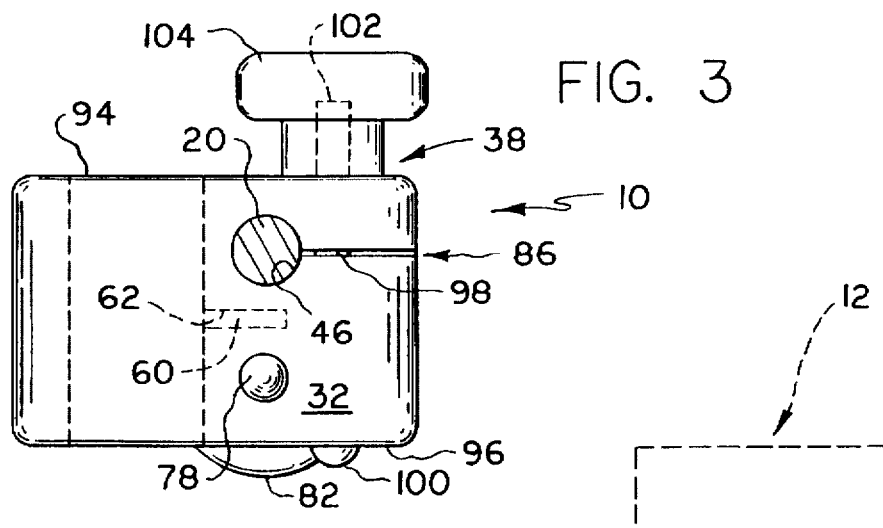
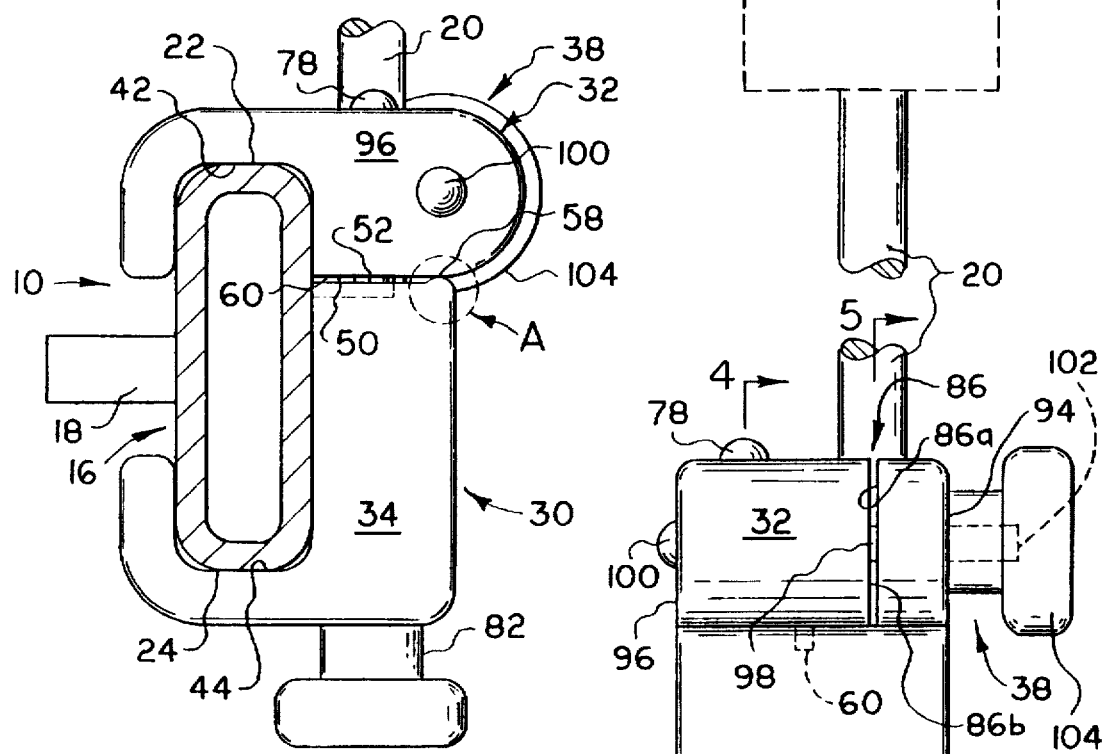
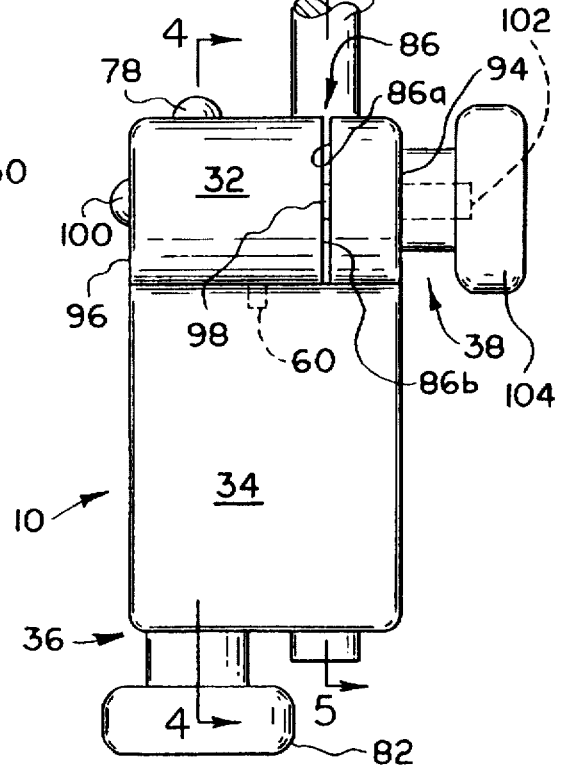

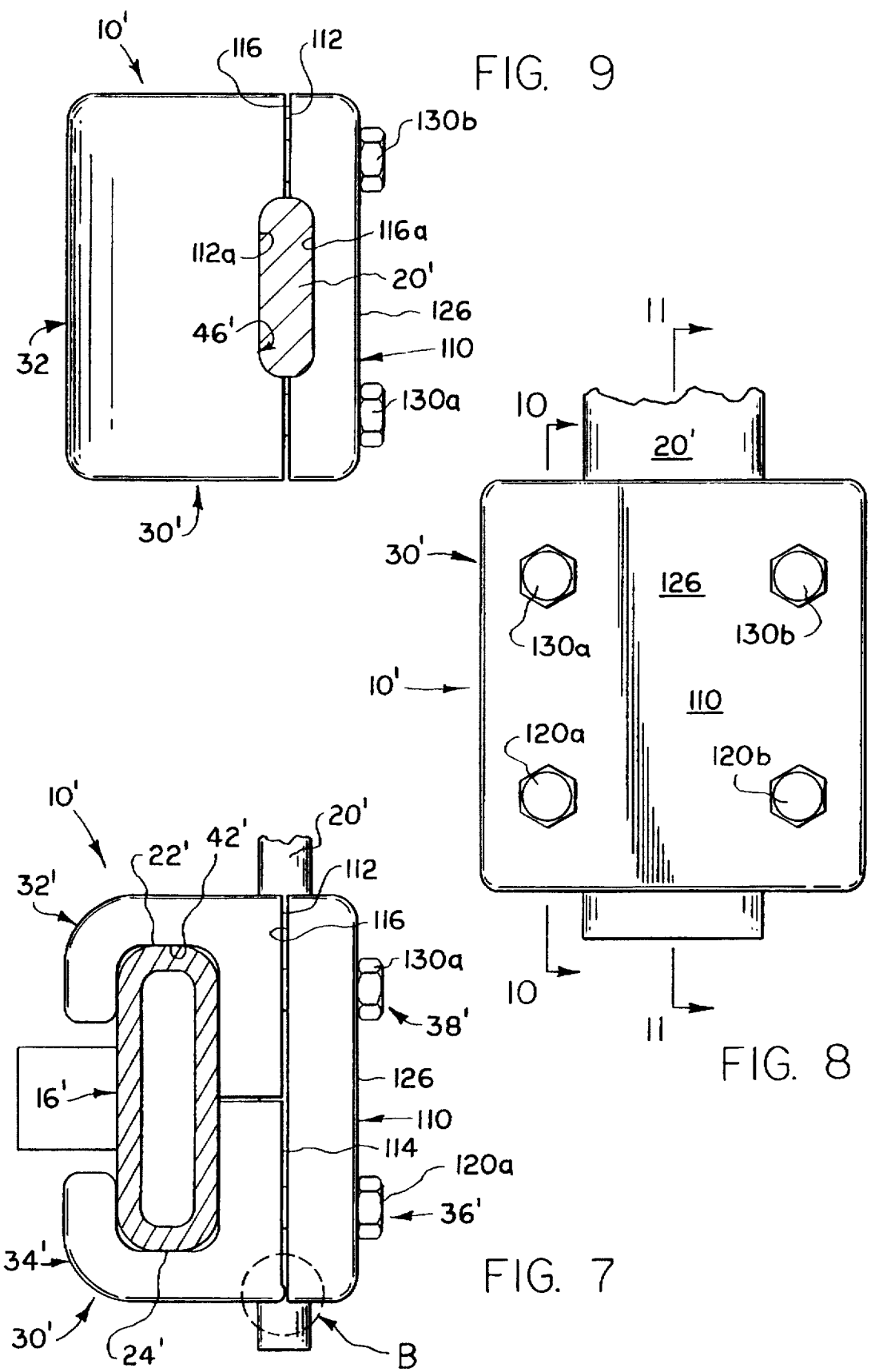

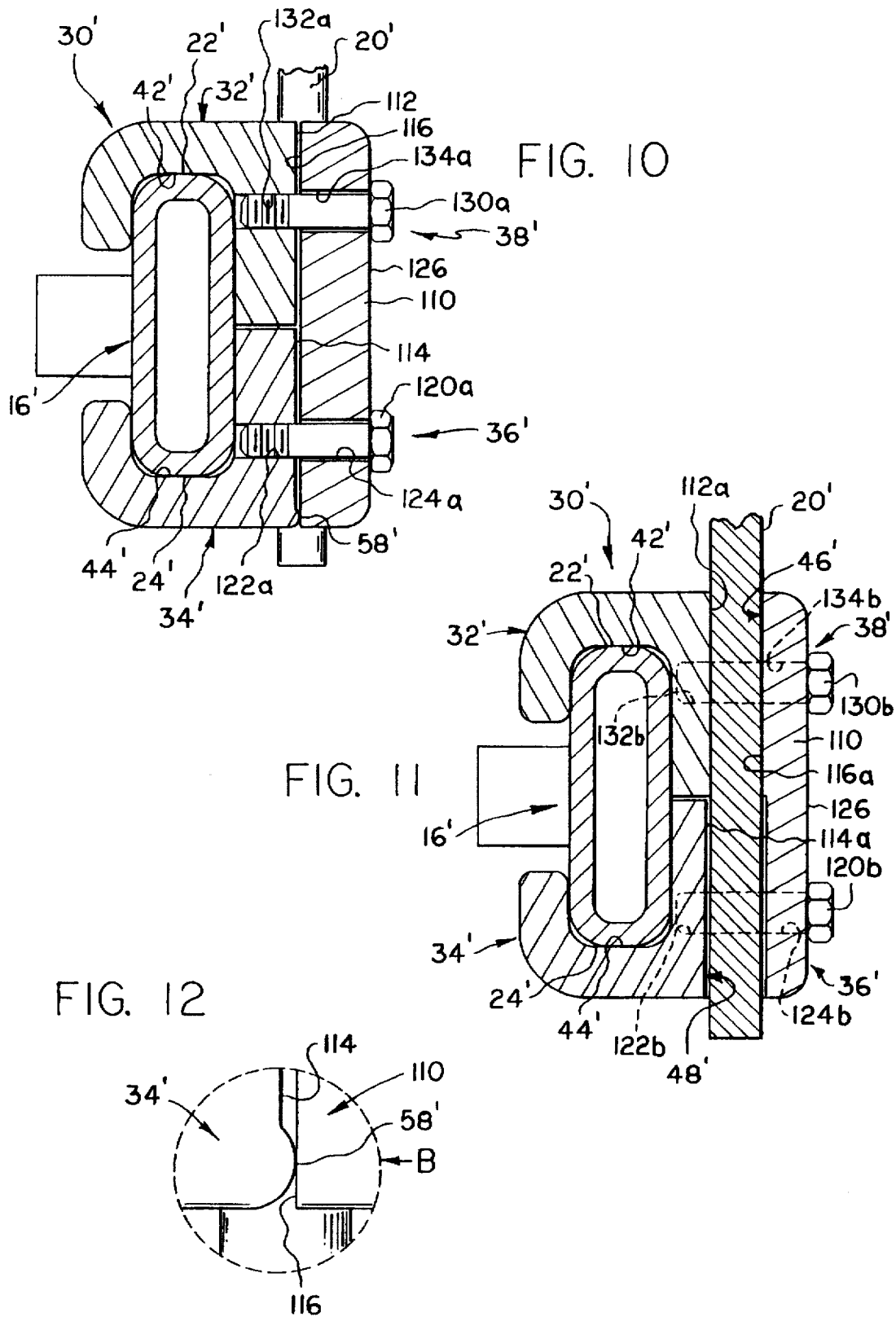

CLAMPING MECHANISM

BACKGROUND OF THE INVENTION

It is common practice to fit endless conveyor mechanisms with various light duty art devices, such as guide rails serving to prevent undesired lateral displacements of articles relative to the path of travel of a conveyor element, or a suitable sensor, such as a photo cell serving to determine the presence or absence of articles transported by the conveyor element; and heavy duty art devices, such as a article ejector serving to eject overweight or underweight articles from continued movement with the conveyor element subsequent to an article weighing operation. These art devices are commonly mounted on support bars or brackets, which are permanently fixed to upstand from adjacent a conveyor element supporting framework of the conveyor mechanism at points spaced lengthwise thereof determined by the specific design of the conveyor mechanism.

SUMMARY OF THE INVENTION

The present invention contemplates supporting art devices relative to a conveyor mechanism in a manner permitting adjustment of such art devices both horizontally lengthwise and vertically relative to the conveyor mechanism.

The invention comprises a clamping mechanism having a mounting rail arranged to extend lengthwise of a path of a path of travel of an article conveyor, a support bar arranged to depend from an art device, and a clamp adapted to releasably clampingly engage with the rail and support bar in order to permit selective and independent horizontal and vertical adjustments of the art device relative to the conveyor mechanism.

More specifically, the clamp includes a clamp body defining first and second recesses for slidably receiving opposite edge portions of the rail whereby to support the clamp body for sliding movement lengthwise of the rail, and a mounting opening including proximality aligned first and second mounting opening portions for slidably receiving the support bar; first adjustment means operable for relatively tilting the recesses for releasably clamping the body against the rail; and second adjustment means operable for releasably clamping the support bar within one of the first and second mounting opening portions with the other of such opening portions being sized to permit free relative tilting thereof and the support bar incident to tilting of the recesses.

BRIEF DESCRIPTION OF THE DRAWINGS

The nature and mode of operation of the present invention will now be more fully described in the following detailed description taken with the accompanying drawings wherein:

FIG. 1 is a side elevational view of clamping mechanism of one form of the present invention;

FIG. 2 is an elevational view of the mechanism, as viewed from the right of FIG. 1, but further showing the mechanism in association with an art device having a depending mounting bar;

FIG. 3 is a top plan view of the mechanism of FIG. 1;

FIG. 7 is a view similar to FIG. 1, but showing an alternative form of the clamping mechanism;

FIG. 8 is an elevational view of the mechanism, as viewed from the right of FIG. 7;

FIG. 9 is a top plan view of the mechanism of FIG. 7;

FIG. 10 is a sectional view taken generally along the line 10—10 in FIG. 8;

FIG. 11 is a sectional view taken generally along the line 11—11 in FIG. 8; and

FIG. 12 is an enlarged view of the area designated as "B" in FIG. 7.

DETAILED DESCRIPTION

Figure 4:
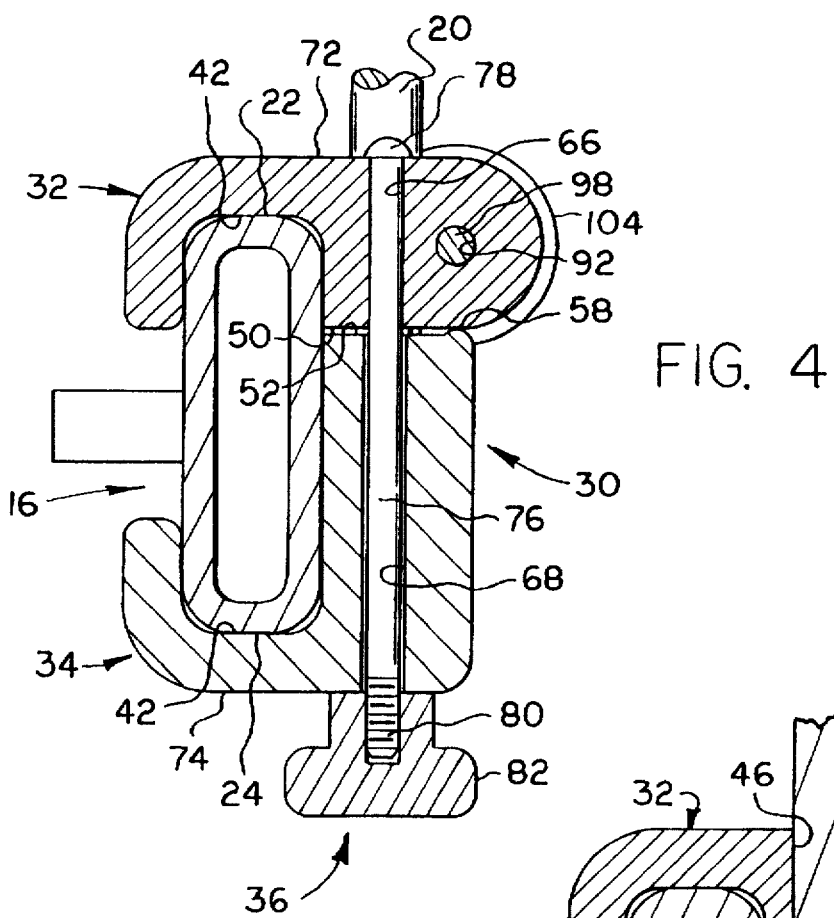
FIG. 4 is a sectional view taken generally along the line 4—4 in FIG. 2.

Reference is first made to FIGS. 1–3, which show a clamping mechanism designated generally as 10 and particularly adapted for mounting a desired light duty art device, which is shown and designated as 12 only in FIG. 2 and intended to be arranged adjacent a conveyor mechanism having, as desired, a belt or chain type conveyor element, not shown, supported for movement relative to a suitable mounting framework, also not shown.

Mechanism 10 is shown in FIGS. 1–3 as including a horizontally elongated rail 16 connected to the framework of the conveyor by spacer members 18. The mode of attaching rail 16 to members 18 and such members to the conveyor framework are a matter of choice.

Light duty art device 12 may for instance be a conventional guide rail, which extends lengthwise of the conveyor element path of travel for use in preventing undesired lateral displacements of articles from engagement with the conveyor element or a suitable sensor employed to determine the presence or absence of articles traveling with the conveyor element. Art device 12 would be provided with or attached to a suitable supporting device, such as a support bar 20.

It is contemplated that each rail 16 would have a length corresponding essentially to the horizontal lengthwise dimension of the conveyor mechanism with which it is to be associated, and opposite lengthwise extending first and second, or upper and lower, rounded edge portions 22 and 24, respectively. Rail 16 is shown as being in the form of a flattened hollow tube, but same could, if desired, be formed from flat bar stock where rigidity of the rail was not a critical factor. It is also contemplated that the rail could be a cylindrical rod or tube, but any such construction would suffer from the difficulty of maintaining constant the vertical orientation of support bar 20 relative to the rail, whenever the art device is freed for adjustment lengthwise of the rail. In any event, it is preferable that spacer members 18 engage only with the central portion of rail 16 in spaced relationship to both of edge portions 22 and 24, as shown in FIG. 1, so as to permit desired adjustments of a clamp to be described to be throughout the whole length of the rail and, when desired, to permit such clamp to be slid onto or off of its ends without requiring disassembly of the clamp into its component parts.

Now referring primarily to FIGS. 1–5, it will be understood that clamping mechanism 10 additionally includes a clamp body 30 formed from a first part 32 and a second part 34; a first adjustment means 36 operable to releasably clamp the clamp body against rail 16; and a second adjustment means 38 operable to releasably clamp support bar 20 relative to the clamp body.

Figure 5:
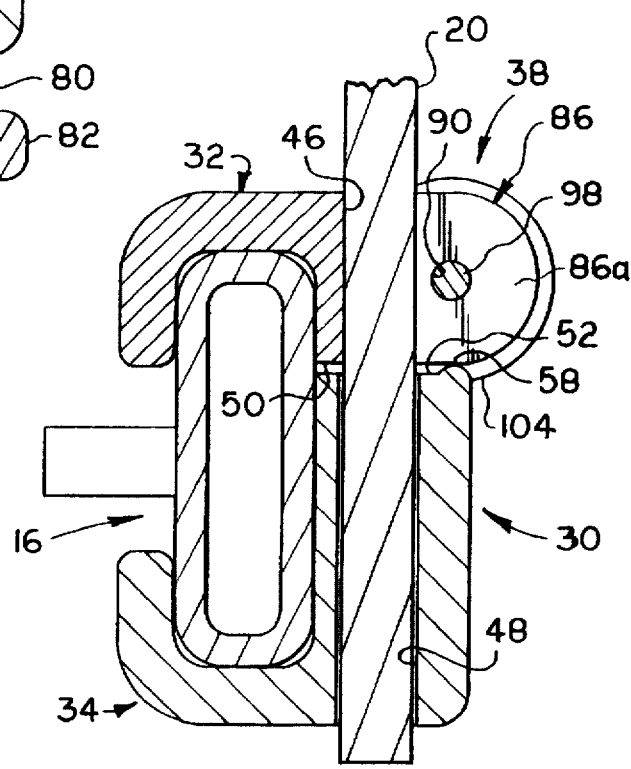
FIG. 5 is a sectional view taken generally along the line 5—5 in FIG. 2.
Figure 6:
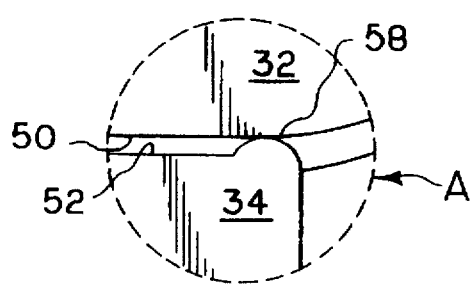
FIG. 6 is an enlarged view of the area designated as "A" in FIG. 1.

Clamp body 30 is provided with facing first and second recesses 42 and 44, which are defined by first and second parts 32 and 34 and sized and shaped to slidably receive rail first and second edges 22 and 24, respectively, as best shown in FIGS. 1, 4 and 5. Clamp body 30 also includes a vertically extending mounting opening for slidably receiving mounting support bar 20, which is best shown in FIG. 5 as being defined by proximately aligned first and second mounting opening portions 46 and 48 extending vertically through first and second parts 32 and 34, respectively. Preferably, first mounting opening portion 46 is sized to slidable received support bar 20 and second mounting opening portion 48 is larger in size such that it may loosely receive the support bar, as best shown in FIG. 5. First and second parts 32 and 34 are also provided with facing bearing surfaces 50 and 52, which engage to permit relative tilting of the first and second parts 32 and 34 under the control of first adjustment means 36 in the manner to be described. Preferably, one or the other of bearing surfaces 50 and 52, such as surface 52, is formed with an elongated rib 58 which engages with surface 50, as best shown in FIG. 6 to define a pivot about which parts 32 and 34, and thus their respective recesses 42 and 44, are tilted as the bearing surfaces are moved towards one another. A rib 60 and slot 62 formed in bearing surfaces 50 and 52, respectively, serve to constrain rotational movement of second part 34 relative to first part 32 as well as relative sliding movement of the parts in a direction extending lengthwise of rail 16.

First adjustment means 36 is best shown in FIG. 4 as including a pair of adjustment openings 66 and 68 dispersed within first and second parts 32 and 34, respectively, with their adjacent ends being arranged in proximate alignment and to open through surfaces 50 and 52 and with their remote ends being arranged to open through outer vertically facing surfaces 72 and 74 of the first and second parts; a bolt 76 arranged to extend through the adjustment openings and having a head end portion 78 arranged for engagement with vertically facing surface 72 and a threaded end portion 80 arranged to extend outwardly of vertically facing surface 74; and a first adjustment or clamping knob 82 threadably engaged with end portion 80. Preferably, adjustment opening 66 is sized to slidably receive bolt 76 and adjustment opening 68 is sized to loosely, slidably receive bolt 76; the arrangement being such as to permit second part 34 to freely move relative to the bolt upon tightening of knob 82 against surface 74 to effect pivotal movement of the second part relative to first part 32 about the pivot axis defined by engagement of rib 58 with bearing surface 50 for purposes of releasably clamping rail 16 within first and second recesses 42 and 44.

First part is shown in FIGS. 2, 3 and 5 as being formed with a slot 86, which extends lengthwise and radially of first mounting opening portion 46 and has facing surfaces 86a and 86b. It is contemplated that first part 32 will be formed of a suitable plastic material, which is resiliently deformable sufficiently to permit movement of facing surfaces 86a and 86b towards and away from one another for varying the size of first mounting opening 46, whereby to releasably clamp support bar 20 therewithin upon manual operation of second adjustment means 38.

Second adjustment means 38 is best shown in FIGS. 2, 3, 4 and 5 as including a pair of adjustment openings 90 and 92 disposed for proximate alignment with adjacent ends thereof opening through facing surfaces 86a and 86b, respectively, and remote ends thereof opening through a pair of oppositely facing outer surfaces 94 and 96 of first part 32; a bolt 98 extending through adjustment openings 90 and 92 and having a head end portion 100 arranged for engagement with outer surface 96 and a threaded end portion 102 arranged to extend outwardly of outer surface 94; and a second adjustment or clamping knob 104 threadably engaged with threaded end portion 102 for releasably clamping against outer surface 94.

Preferably, as shown in FIGS. 4 and 5, openings 48 and 68 are both sized to loosely receive support bar 20 and bolt 76 therewithin in order to free the second part for tilting movement relative to such support bar and bolt and thus permit pivotal movement of the second part relative to first part 32 for rail clamping purposes.

In operation of the first form of the present invention shown in FIGS. 1–6, first adjustment means 36 is operable for allowing sliding adjustment of body 30 relative to rail 16, while second adjustment means 38 is operable to clamp the body against support bar 20, and the second adjustment means is operable for allowing sliding adjustment of the body relative to the support bar, while the first adjustment means is operable to clamp the body against the rail. Thus, relative adjustment movements of body 30 relative to rail 10 or bar 20 may be effected without changing the position of the clamp relative to the other of the rail and bar.

Reference is now made to FIGS. 7–12, which show a clamping mechanism 10' particularly adapted for mounting a relatively heavy duty art device, such as an improper weight article ejector, not shown, adjacent a conveyor mechanism, which includes a horizontally elongated rail 16' formed with first and second rounded edge portions 22' and 24'. As with the embodiment of FIGS. 1–6, clamping mechanism 10' additionally includes a clamp body 30'; a first adjustment means 36' operable for releasable clamping the body against rail 16'; and a second adjustment means 38' operable for releasably clamping the body relative to a support bar 20' which depends from a desired art device. Further in this construction, first and second parts 32' and 34' continue to define facing first and second recesses 42' and 44' sized and shaped to slidably receive rail first and second edges 22' and 24', respectively, for purposes of releasably clamping body 30' relative to rail 16' upon manual operation of first adjustment means 36' to effect relative tilting of such recesses.

Still further in this construction, clamp body 30' defines a mounting opening for receiving support bar 20', which includes proximately aligned first and second mounting opening portions 46' and 48' shown generally in FIG. 11.

Clamp body 30' differs from clamp body 30 in that it additionally includes a third part 110, and in that first and second parts 32' and 34' define first and second mounting surfaces 112 and 114 arranged to face in a direction away from rail 16' when it's edge portions 22' and 24' are slidably received by recesses 42' and 44' and third part 110 is formed with a third mounting surface 116 arranged in a facing relationship with both of the first and second mounting surfaces. Mounting surfaces 112, 114 and 116 are formed with recesses 112a, 114a and 116a, respectively, wherein recesses 112a and 116a cooperate to define a mounting opening portion 46' and recesses 114a and 116a cooperate to define mounting opening portion 48'. As will be apparent from viewing FIG. 11, mounting opening portions 46' and 48' cooperate to define a mounting opening in which support bar 20' is received for clamping adjustment. Mounting opening portion 48' is required to be of larger size than mounting opening portion 46', so as to permit pivotal movement of second part 34' relative to first part 32' when support bar 20' is clamped within mounting opening portion 46'.

The mounting surfaces 114 and 116 of second and third parts 34' and 110 also define bearing surfaces, which engage so as to permit tilting of second part 32' relative to first part 32' for purposes of effecting relative tilting of recesses 42' and 44', as required to releasably clamp body 30' against rail 16'. Preferably, one or the other of these surfaces, such as surface 114, is formed with a rib 58' engaged with surface 116 remotely of first mounting surface 112 to define a pivot axis for second part 34', as shown generally in FIGS. 7, 10 and 12.

First adjustment means 36' is best shown in FIGS. 8, 10 and 11 as including one and preferably a pair of first treaded bolts 120a and 120b, a pair of first threaded openings 122a and 122b defined by second part 34' and a pair of first bore openings 124a and 124b extending through third part 110. Thus, bolts 120a and 120b freely extend through bore openings 124a and 124b for threaded receipt within openings 122a and 122b, whereby the tightening of such bolts against outer surface 126 of third part 110 effects tilting of second part 34' about the pivot axis defined by rib 58'.

Second adjustment means 38' is also bent shown in FIGS. 8, 10 and 11 as including one and preferably a pair of second threaded bolts 130a 130b, a pair of second threaded openings 132a and 132b defined by first part 32' and a pair of second bore openings 134a and 134b extending through third part 110. Thus, bolts 130a and 130b freely extend through bore openings 134a and 134b for threaded receipt within openings 132a and 132b, whereby the tightening of such bolts against outer surface 126 of third part 110 effects clamping of support bar 20' within mounting opening portion 46'.

The loose fitting of support bar 20' within mounting opening portion 48', while allowing for the releasably clamping of the support bar within mounting opening portion 46' allows for adjustment of clamp body 30' lengthwise of rail 16' without effecting the positioning of the support bar relative to the clamp body, as well as adjustment of the clamp body relative to the support bar without effecting the positioning of the clamp body lengthwise of the rail.

What is claimed is:

1. A clamping mechanism for adjustably supporting an art device relative to a conveyor, said mechanism comprising in combination:
    a rail arranged to extend lengthwise of said conveyor, said rail having opposite lengthwise extending first and second edge portions;
    a support bar arranged to depend from said art device;
    a clamp body defining first and second recesses for slidably receiving said first and second edge portions, respectively, whereby to support said clamp body for sliding movement lengthwise of said rail, said recesses being tiltable relative to one another to effect releasable clamping of said body against said rail to constrain said clamp body against movement lengthwise of said rail, said body also defining a mounting opening including proximately aligned first and second mounting opening portions for slidably receiving said support bar;
    first adjustment means operable for relatively tilting said first and second recesses for releasably clamping said body against said rail; and
    second adjustment means operable for releasably clamping said support bar within one of said first and second mounting opening portions, the other of said first and second mounting opening portions being sized to permit free tilting movement thereof relative to said support bar incident to said tilting of said first and second recesses.

2. A clamping mechanism according to claim 1, wherein said body includes first and second parts defining said first and second recesses and said first and second mounting opening portions, respectively.

3. A clamping mechanism according to claim 2, wherein said first part defines said first recess, said second part defines said second recess, said first and second parts cooperate to define pivot means about which said second part is tilted relative to said first part to effect relative tilting of said first and second recesses upon operation of said first adjustment means.

4. A clamping mechanism according to claim 3, wherein said first adjustment means is a threaded clamping device extending through said first and second parts intermediate said pivot means and said recesses.

5. A clamping mechanism according to claim 4, wherein said first part is formed of a resiliently deformable material; and said second adjustment means includes a slot extending lengthwise of said first mounting opening portion and radially therefrom through said first part, a threaded clamping device slidably extending through said first part across said slot for resiliently deforming said first part and releasably clamping said support bar within said first mounting opening portion.

6. A clamping mechanism according to claim 1, wherein said body includes first, second and third parts, said third part cooperating with said first part to define said first mounting opening portion and with said second part to define said second mounting opening portion.

7. A clamping mechanism according to claim 6, wherein said first and second parts define said first and second recesses, respectively, said second and third parts cooperate to define pivot means about which said second part tilts relative to said first part to effect relative tilting of said first and second recesses upon operation of said first adjustment means.

8. A clamp for attachment to a rail adapted to extend generally horizontally lengthwise of a conveyor for supporting an art device for adjustment both lengthwise and vertically relative to said conveyor, said rail having opposite lengthwise extending edge portions, said art device having a dependent support bar, and said clamp comprising:
    a first part having a first bearing surface, a first recess for slidably receiving one of said edge portions and a first mounting opening portion;
    a second part having a second bearing surface, a second recess for slidably receiving an other of said edge portions and a second mounting opening portion, said second bearing surface being arranged for engagement with said first bearing surface for positioning said second mounting opening portion in proximate alignment with said first mounting opening portion and for effecting tilting of said second recess relative to said first recess to clamp said first and second parts against said edge portions upon movement of said second part towards said first part, said support bar being insertable within said mounting opening portions when in proximate alignment;
    first adjustment means for effecting movement of said second part towards said first part for releasably clamping said first and second parts against said edge portions; and
    second adjustment means for releasably clamping said support bar against movement lengthwise of said first and second mounting opening portions.

9. A clamp according to claim 8, wherein one of said first and second parts is formed with a slot extending lengthwise and radially of its associated one of said first and second mounting opening portions, said slot having facing surfaces, said one of said first and second parts being resiliently deformable sufficiently to permit movement of said facing surfaces towards and away from one another for varying the size of said associated one of said first and second mounting openings, and said second adjustment means varies the distance between said facing surfaces, thereby to vary the size of said associated one of said first and second mounting opening portions for releasably clamping said support bar therewithin.

10. A clamp according to claim 9, wherein said second adjustment means includes a pair of adjustment openings disposed for proximate alignment with adjacent ends thereof opening through said facing surfaces and remote ends thereof opening through a pair of oppositely facing outer surfaces of said one of said first and second parts, a threaded bolt extending through said adjustment openings and bridging said slot, said bolt having a head end portion arranged for engagement with one of said outer surfaces and a threaded end portion arranged to extend outwardly of the other of said outer surfaces, and a knob threadably engaged with said threaded end portion for releasable clamping engagement with said other of said outer surfaces.

11. A clamp according to claim 8, wherein said second adjustment means releasably clamps said support bar within one of said first and second mounting opening portions, and the other of said first and second mounting opening portions is sized to loosely receive said support bar so as to permit tilting of said second recess relative to said first recess.

12. A clamp according to claim 8, wherein said second adjustment means is carried by said first part for releasably clamping said support bar within said first mounting opening portion, and said second mounting opening portion is enlarged relative to said first mounting opening portion and sized to freely slidably receive said support bar when said second recess is tilted relative to said first recess sufficiently to clamp said first and second parts against said edge portions.

13. A clamp according to claim 8, wherein said first part is formed with a slot extending lengthwise and radially of said first mounting opening portion, said slot having facing surfaces, said first part being resiliently deformable sufficiently to permit movement of said facing surfaces towards and away from one another to reduce the size of said first mounting opening portion to releasably effect clamping of said support bar therewithin; said second adjustment means includes a pair of adjustment openings disposed within said first part in proximate alignment with adjacent ends thereof opening through said facing surfaces and remote ends thereof opening through a pair of opposite facing outer side surfaces of said first part, a threaded bolt extending through said adjustment openings and bridging said slot, said bolt having a head end portion arranged for engagement with one of said outer side surfaces and a threaded end portion arranged to extend outwardly of the other of said outer side surfaces, and a knob threadably engaged with said threaded end portion for releasable clamping engagement with said other of said outer side surfaces; said second mounting opening portion is enlarged relative to said first mounting opening portion and sized to freely slidably receive said support bar when said second recess is tilted relative to said first recess sufficiently to clamp said parts against said edge portions; and said first adjustment means includes a second pair of adjustment openings disposed one within each of said first and second parts in proximate alignment with adjacent ends thereof opening through said first and second bearing surfaces and remote ends thereof opening through outer vertically facing surfaces of said first and second parts, a second threaded bolt extending through said second pair of adjustment openings, said second threaded bolt having a head end portion arranged for engagement with said vertically facing surface of said first part and a threaded end portion arranged to extend outwardly of said vertically facing surface of said second part, and a second knob threadably engaged with said threaded end portion of said second bolt for releasable clamping engagement with said vertically facing surface of said second part, and said adjustment openings of said second pair are sized relative to said second bolt to permit tilting of at least one of said first and second parts relative thereto incident to said tilting of said second recess relative to said first recess.

14. A clamp according to claim 13, wherein said first and second bearing surfaces are formed with removably engageable projection and slot means for constraining relative rotation of said first and second parts about an axis extending in proximate alignment with said second pair of adjustment openings.

15. A clamp for attachment to a rail adapted to extend generally horizontally lengthwise of a conveyor for supporting an art device for adjustment both lengthwise and vertically relative to said conveyor, said rail having opposite lengthwise extending first and second edge portions, said art device having a dependent support bar, and said clamp assembly comprises:

a clamp body having first, second and third parts, said first and second parts defining facing first and second recesses for slidably receiving said first and second edge portions, respectively, and first and second mounting surfaces facing in a direction away from said rail when said edge portions thereof are slidably received by said recesses, said third part having a third mounting surface arranged in facing relationship with both said first and second mounting surfaces, said mounting surfaces being formed with recesses cooperating to define a mounting opening for slidably receiving said support bar and including a first mounting opening portion extending essentially coextensive with said first mounting surface and a second mounting opening portion extending essentially coextensive with said second mounting surface;

pivot means extending between said second and third mounting surfaces adjacent edges thereof disposed remotely of said first mounting surface;

first adjustment means for tilting said second part relative to said first part about said pivot means for releasably clamping said first and second parts against said edge portions of said rail; and second adjustment means for clamping said support bar within said first mounting opening portion, said second mounting opening portion being sized to permit free relative movement of said support bar within said second mounting opening portion when said second part is tilted relative to said first part, said first adjustment means being operable for allowing sliding adjustment of said body relative to said rail, while said second adjustment means is operable to clamp said first and third parts against said support bar, and said second adjustment means being operable for allowing sliding adjustment of said body relative to said support bar, while said first adjustment means is operable to clamp said first and second parts relative to said rail.

16. A clamp according to claim 15, wherein said first adjustment means includes a first threaded bolt, a first threaded opening defined by said second part and a first bore opening extending through said third part in proximate alignment with said first threaded opening, said first bolt extending through said first bore opening and into said first threaded opening for effecting said tilting of said second part relative to said first part, and said second adjustment means includes a second threaded bolt, a second threaded opening defined by said first part and a second bore opening extending through said third part in proximate alignment with said second threaded opening, said second bolt extending through said second bore opening and into said second threaded opening for clamping said support bar within said first mounting opening portion.

17. A clamp according to claim 16, wherein said first adjustment means includes two each of said first bolt, first threaded opening and first bore opening arranged on laterally opposite sides of said second mounting opening portion; and said second adjustment means includes two each of said second bolt, second threaded opening and said second bore opening arranged on laterally opposite sides of said first mounting opening portion.

18. A clamping mechanism for adjustably supporting an art device relative to a conveyor, said mechanism comprising in combination:

a rail arranged to extend lengthwise of said conveyor and having opposite lengthwise extending first and second edge portions;

a support bar arranged to depend from said art device;

a clamp body defining first and second recesses for slidably receiving said first and second edge portions, respectively, and a mounting opening for slidably receiving said support bar;

first means for relatively tilting said recesses for releasably clamping said clamp body against said rail; and second means for releasably clamping said support bar within said mounting opening.

19. A mechanism according to claim 18, wherein said clamp body includes first and second parts defining said first and second recesses, respectively, said first means is associated with said second part and said second means is associated with said first part.

20. A mechanism according to claim 19, wherein first and second parts have facing bearing surfaces defining a pivot about which said parts pivot to effect tilting of said recesses.

21. A mechanism according to claim 18, wherein said clamp body includes first, second and third parts, said first and second parts defining said recesses, said first and third parts defining said mounting opening, and said second and third parts defining facing bearing surfaces defining a pivot about which said second part pivots relative to said first part to effect tilting of said recesses.

* * * * *